(12) United States Patent  
Vassiliou

(10) Patent No.: US 6,279,207 B1  
(45) Date of Patent: Aug. 28, 2001

(54) FASTENERS WITH INCREASED HOLDING POWER

(75) Inventor: Eustathios Vassiliou, Newark, DE (US)

(73) Assignee: WTPA, Incorporated, Newark, DE (US)

( * ) Notice: Subject to any disclaimer, the term of this patent is extended or adjusted under 35 U.S.C. 154(b) by 0 days.

(21) Appl. No.: 09/482,714

(22) Filed: Jan. 13, 2000

Related U.S. Application Data

(60) Provisional application No. 60/118,046, filed on Feb. 1, 1999.

(51) Int. Cl.[7] ............................ A44B 17/00; A44B 21/00; F16B 21/00
(52) U.S. Cl. ................................. 24/293; 24/289; 24/295
(58) Field of Search ............................. 24/293, 295, 289

(56) References Cited

U.S. PATENT DOCUMENTS

| | | | |
|---|---|---|---|
| 2,322,656 | 6/1943 | Murphy | 24/73 |
| 2,329,688 | 9/1943 | Bedford | 189/88 |
| 2,607,971 | 8/1952 | Bedford | 24/73 |
| 2,825,948 | 3/1958 | Parkin | 24/73 |
| 3,208,119 | * 9/1965 | Seckerson | 24/293 |
| 3,525,129 | 8/1970 | Holton | 24/73 |
| 3,673,643 | 7/1972 | Kindell | 24/73 B |
| 4,074,465 | * 2/1978 | Bright | 24/289 |
| 4,683,622 | 8/1987 | Oehlke | 24/458 |
| 5,314,280 | 5/1994 | Gagliardi | 411/182 |
| 5,373,611 | 12/1994 | Murata | 24/297 |
| 5,422,789 | 6/1995 | Fisher et al. | 361/719 |
| 5,533,237 | * 7/1996 | Higgins | 24/289 |
| 5,542,158 | 8/1996 | Gronau et al. | 24/295 |
| 5,887,319 | 3/1999 | Smith | 24/293 |

FOREIGN PATENT DOCUMENTS

| | | | |
|---|---|---|---|
| 0632590 | * 6/1963 | (BE) | 24/295 |
| 496700 | 10/1953 | (CA) . | |
| 0577499 | * 5/1933 | (DE) | 24/295 |
| 1030796 | * 5/1966 | (GB) | 24/295 |
| 1171363 | * 11/1969 | (GB) | 24/295 |
| 0550316 | * 3/1958 | (IT) | 24/295 |

\* cited by examiner

*Primary Examiner*—Victor N. Sakran  
(74) *Attorney, Agent, or Firm*—E. Vassiliou

(57) ABSTRACT

This invention discloses fasteners characterized by the use of barbs to secure a primary object in place. More particularly, the barbs which are used are critically shaped barbs resulting in considerable increase of the holding force without sacrificing the flexibility of the barbs, and without sacrificing the broad acceptability of various thicknesses of the primary object to be fastened.

22 Claims, 3 Drawing Sheets

FASTENERS WITH INCREASED HOLDING POWER

RELATED APPLICATIONS

This application claims priority of provisional patent application 60/118,046, filed on Feb. 1, 1999, which provisional patent application is incorporated herein by reference.

FIELD OF THE INVENTION

This invention relates to fasteners in general, and more particularly to those fasteners characterized by using barbs to secure an object in place.

BACKGROUND OF THE INVENTION

A large number of fasteners have been used in the past for securing one object on another object, at least partially by means of barbs.

Examples include U.S. Pat. Nos. 2,322,656; 2,329,688 (the barbs referred to as locking tongues 19; see column 2, lines 14–22), U.S. Pat. Nos. 2,607,971; 2,825,948; 3,525,129; 3,525,129; 3,673,643; 4,683,622; 5,314,280; 5,422,789; 5,373,611; 5,542,158 (the barbs referred to as wedge-like extensions; see column 3, lines 10–17), U.S. Pat. No. 5,887,319; and Canadian Patent 496,700, among a plethora of other references.

SUMMARY OF THE INVENTION

The instant invention is directed to fasteners characterized by the use of barbs to secure an object in place. More particularly, the instant invention pertains a fastener having a fastening region within which at least a part of a primary object can be inserted, the fastener comprising a first structural side adjacent to the fastening region, the first structural side comprising a first bent barb extending from the first structural side into the fastening region, the first bent barb having a first back portion adjacent to the first structural side and a first front portion adjacent to the primary object, when the primary object has been inserted into the fastening region, the first front portion having a first angle with respect to the primary object which is different than a respective second angle that the first front portion would have with respect to the primary object if the first barb were straight and not bent, the fastening region having an insertion end through which the primary object is to be inserted, the first back portion of the first bent barb being closer to the insertion point than the first front portion of the first bent barb. For best results, the first angle is greater than the second angle.

With this configuration, the primary object can also be removed after it has been inserted, without manipulation of the fastener, The fastener may be inserted into a slot of a secondary object, or otherwise secured or attached on a secondary object, so that the two objects are finally secured or attached to each other through the fastener.

It is preferable that the fastener further comprises a second structural side opposite the first structural side, wherein the second structural side comprises a second barb. The second barb may be a straight barb.

It is preferable that the second bent barb extends from the second structural side into the fastening region, the second bent barb having a second back portion adjacent to the second structural side and a second front portion adjacent to the primary object, when the primary object has been inserted into the fastening region, the second front portion having a third angle with respect to the primary object which is different than a respective fourth angle that the second front portion would have with respect to the primary object if the second barb were straight and not bent, the second back portion of the second bent barb being closer to the insertion point than the second front portion of the second bent barb. For best results, the third angle is greater than the fourth angle.

The present invention also relates to a vehicle which comprises a fastener as described above.

DESCRIPTION OF THE DRAWING

The reader's understanding of practical implementation of preferred embodiments of the invention will be enhanced by reference to the following detailed description taken in conjunction with perusal of the drawing figures, wherein.

DETAILED DESCRIPTION OF THE INVENTION

As aforementioned, the instant invention is directed to fasteners characterized by the use of barbs to secure a primary object in place. More particularly, the instant invention pertains a fastener which uses critically shaped barbs in order to increase the holding power of the barbs, and therefore of the fastener, so that the primary object is held by the fastener with an increased holding force. This is accomplishes without sacrificing the flexibility of the barbs, and also without sacrificing the broad acceptability of various thicknesses of the primary object to be fastened.

Figure 1:
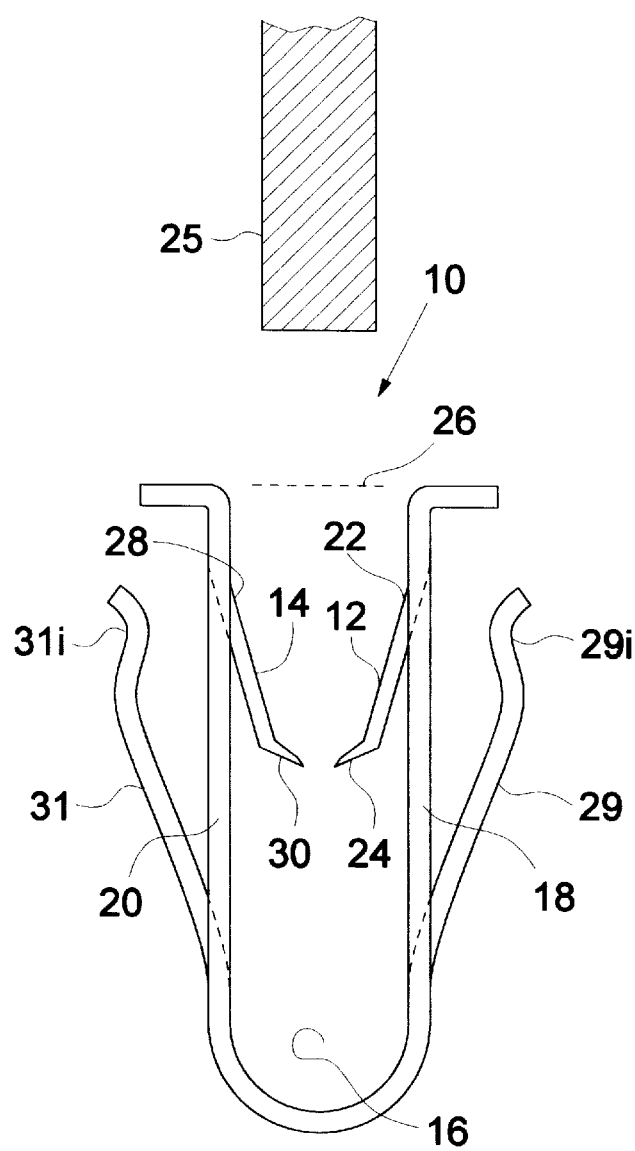
FIG. 1 shows an example of a fastener according to an embodiment of the instant invention.

Referring now to FIG. 1, there is depicted an example of a fastener 10, according to one embodiment of the present invention. The fastener 10 would have been a conventional fastener if it were not provided with a first bent barb 12 and a second bent barb 14. Conventional fasteners have barbs which are not bent but straight.

The fastener 10 has a first structural side 18 from which the first bent barb 12 extends into the fastening region 16. The fastener 10 has also a second structural side 20 from which the second bent barb 14 extends into the fastening region 16.

The first bent barb 12 has a first back portion 22, adjacent to the first structural side 18, and a first front portion at the other end of the bent barb adjacent to the primary object 25, when the primary object 25 has been inserted into the primary fastening region 16. It is critical that the first back portion 22 of the first bent barb 12 is closer to the insertion point 26 of the fastener 10, than the first front portion 24

Similarly, the second bent barb 14 has a second back portion 28, adjacent to the second structural side 20, and a second front portion 30 at the other end of the second bent barb 14, adjacent to the primary object (not shown), when the primary object has been inserted into the primary fastening region 16. It is also critical that the second back portion 28 of the second bent barb 14 is closer to the insertion point 26 of the fastener 10, than the second front portion 30.

The fastener also comprises spring members 29 and 31, which have recesses 29i and 31i, respectively.

Figure 2:
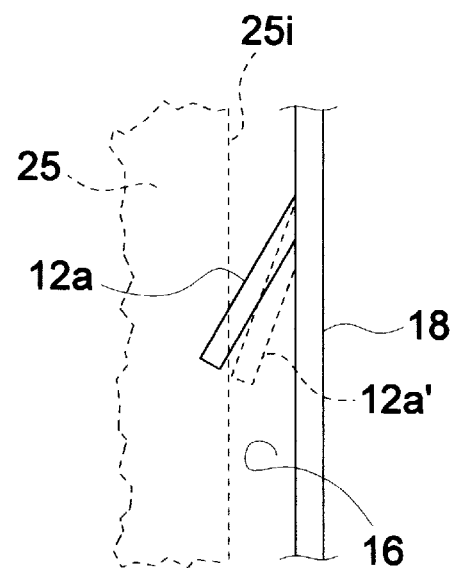
FIG. 2 is a fractional view illustrating the function of a conventional fastener with straight barbs.

In the case of a conventional fastener, a fragmental view of which is better shown in FIG. 2, a straight barb 12a (in the absence of the primary object 25) takes the position 12a' when the primary object 25 is inserted in the fastening region 16

Figure 3:
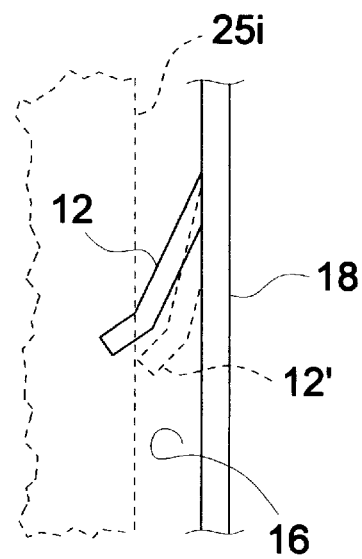
FIG. 3 is a fractional view illustrating the function of a fastener according to the present invention with bent barbs.

In the case of the fastener of the instant invention, a fragmental view of which is better shown in FIG. 3, a bent barb 12 (in the absence of the primary object 25) takes the position 12' when the primary object 25 is inserted in the fastening region 16.

Figure 4:
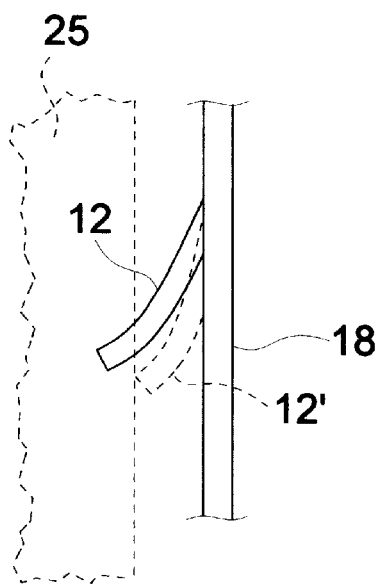
FIG. 4 is a fractional view illustrating the function of a fastener according to the present invention with bent barbs having a curved configuration.

The bent can be rather abrupt as shown in FIGS. 1 and 3 or gradual in the form of a curve as illustrated in FIG. 4.

The considerable difference in holding power between the two cases is believed to be due to the higher angle provided between the barb and the primary object by the configuration of present invention as compared to the configuration involving a straight barb.

Figure 5:
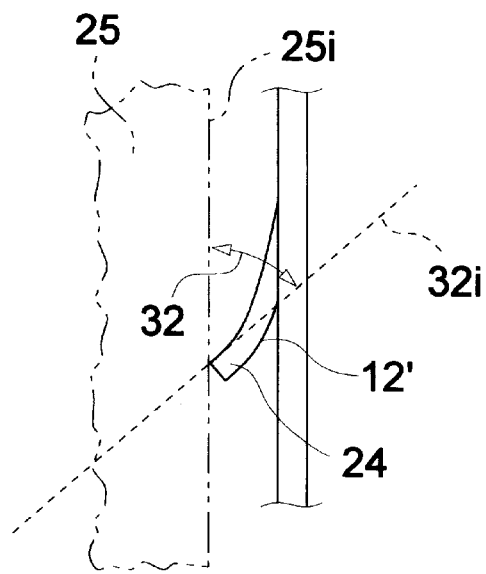
FIG. 5 is a fractional view illustrating the angle between the front portion of a bent barb, according to this invention, and the side surface of the primary object.
Figure 6:
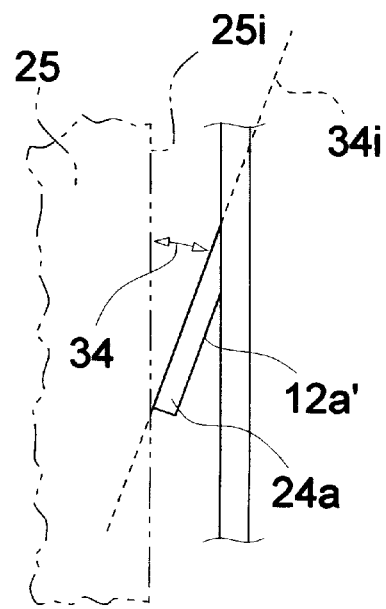
FIG. 6 is a fractional view illustrating the angle between the front portion of a straight barb, according to the prior art, and the side surface of the primary object.

This can be better seen in FIGS. 5 and 6. It is very clear that for a similar length of a barb, the angle between the front portion 24 of the bent barb 12 and the primary object 25 (FIG. 5) is considerably greater than the angle between the front portion 24a of the straight barb 12a and the primary object 25 (FIG. 6). The angles are defined as the angle between the side surface 25i of the primary object 25 and the tangent 32i to the first front portion 24, in the case of the bent barb (FIG. 5), and the angle between the side surface 25i of the primary object 25 and the tangent 34i to the first front portion 24a, in the case of the straight barb (FIG. 6).

Although the holding strength of the straight barb 12a may be increased by shortening the barb and increasing the angle 34, the acceptability of primary objects having, various thicknesses decreases drastically. In contrast, a longer bent barb according to the instant invention has considerably higher flexibility, very improved acceptability regarding thickness of the primary object, and considerably higher holding power.

The thickness of the primary object can be such as to just fit in the fastening region, or it can be considerably smaller.

All barbs involved are preferably bent barbs, but this invention includes the case where at least one barb is curved and the rest of the barbs are straight. This invention also encompasses the case in which only one bent barb (no other barbs, bent or straight) is present.

Barbs, such as 12 and 24 for example may have front portions 24 and 30, respectively, which are located apart from each other, as shown in FIG. 1, or they may have front portions overlapping (front portion 24 to be closer to the second structural side 20 than the front portion 30, and front portion 30 to be closer to the first structural side 18 than the front portion 24).

Figure 7:
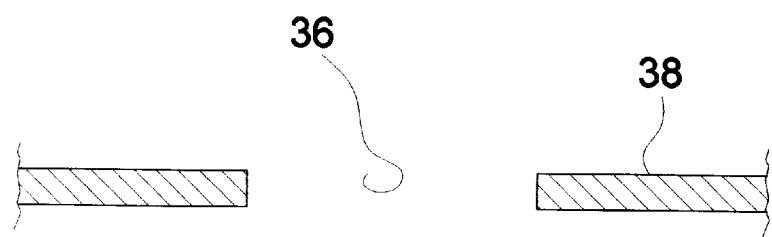
FIG. 7 shows a cross section of a secondary object.
Figure 8:
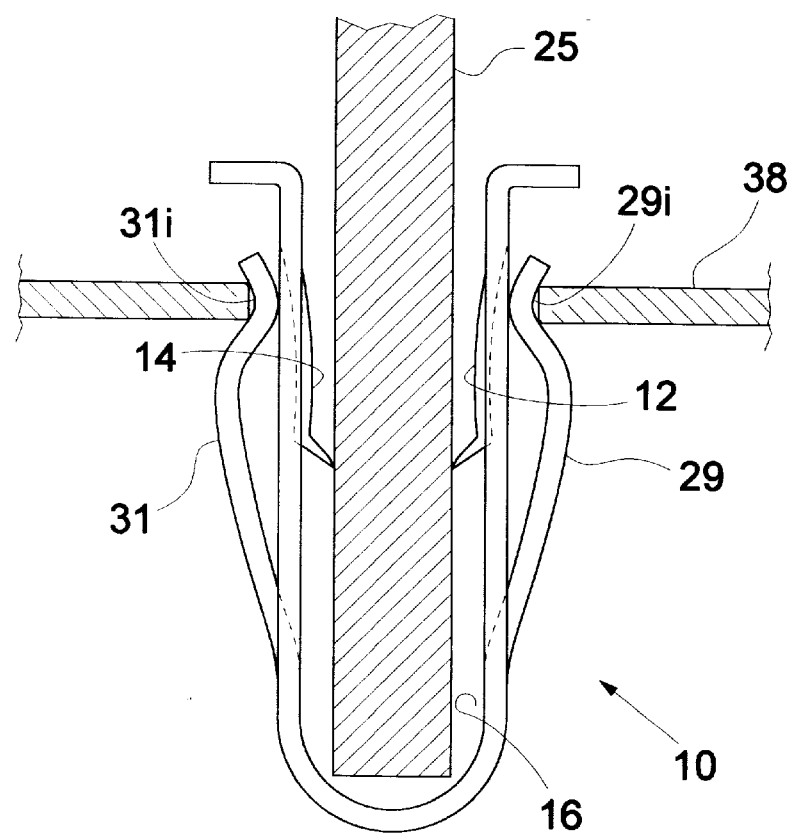
FIG. 8 shows a cross section of the fastener of the present invention with the primary object inserted into the fastening region, and the secondary object engaged with the recesses of the fastener.

In operation of this embodiment, the fastener 10 (FIG. 1) is inserted into the slot 36 of a secondary object 38, as better shown in FIGS. 7 and 8, where it is engaged to the secondary object 38 at the recesses 29i and 31i. The primary object 25 is inserted into the fastening region 16, where it is engaged by the bent barbs 12 and 14. The sequence of the two insertion operations is immaterial. Due to the bent nature of the barbs 12 and 14, the primary object is held in place with a considerably higher holding power, than if the barbs had a straight configuration. In the Automotive Industry, the primary object is a plastic, while the secondary object is metal.

Automobiles or other vehicles may be made, comprising one or more of the fasteners of the instant invention, providing substantial improvements regarding safety, performance and comfort.

Examples of embodiments demonstrating the operation of the instant invention, have now been given for illustration purposes only, and should not be construed as restricting the scope or limits of this invention in any way.

What is claimed is:

1. A fastener having a fastening region within which at least a part of a primary object can be inserted, the fastener comprising a first structural side adjacent to the fastening region, the first structural side comprising a first bent barb extending from the first structural side into the fastening region, the first bent barb having a first back portion and a first front portion adjacent to and pointing toward the primary object, when the primary object has been inserted into the fastening region, the first front portion having a first angle with respect to the primary object which is different than a respective second angle that the first front portion would have with respect to the primary object if the first barb were straight and not bent, the fastening region having an insertion end through which the primary object is to be inserted, the first back portion of the first bent barb originating from a point on the first structural side located under said insertion point and being closer to the insertion point than the first front portion of the first bent barb.

2. A fastener as defined in claim 1, wherein the first angle is greater than the second angle.

3. A fastener as defined in claim 2, further comprising a second structural side opposite the first structural side.

4. A fastener as defined in claim 3, wherein the second structural side comprises a second barb.

5. A fastener as defined in claim 4, wherein the second barb is a straight barb.

6. A fastener as defined in claim 1, further comprising a second structural side opposite the first structural side.

7. A fastener as defined in claim 6, wherein the second structural side comprises a second barb.

8. A fastener as defined in claim 7, wherein the second barb is a straight barb.

9. A fastener having a fastening region within which at least a part of a primary object can be inserted, the fastener comprising:

a first structural side adjacent to the fastening region, the first structural side comprising a first bent barb extending from the first structural side into the fastening region, the first bent barb having a first back portion adjacent to the first structural side and a first front portion adjacent to the primary object, when the primary object has been inserted into the fastening region, the first front portion having a first angle with respect to the primary object which is different than a respective second angle that the first front portion would have with respect to the primary object if the first barb were straight and not bent, the fastening region having an insertion end through which the primary object is to be inserted, the first back portion of the first bent barb being closer to the insertion point than the first front portion of the first bent barb; and a second structural side opposite the first structural side comprising a second barb, wherein the second bent barb extends from the second structural side into the fastening region, the second bent barb having a second back portion adjacent to the second structural side and a second front portion adjacent to the primary object, when the primary object has been inserted into the fastening region, the second front portion having a third angle with respect to the primary object which is different than a respective fourth angle that the second front portion would have with respect to the primary object if the second barb were straight and not bent, the second back portion of the second bent barb being closer to the insertion point than the second front portion of the second bent barb.

10. A fastener as defined in claim 9, wherein the first angle is greater than the second angle.

11. A fastener as defined in claim 9, wherein the third angle is greater than the fourth angle.

12. A vehicle comprising a fastener having a fastening region within which at least a part of a primary object can be inserted, and can be removed after it has been inserted, without manipulation of the fastener, the fastener comprising a first structural side adjacent to the fastening region, the first structural side comprising a first bent barb extending from the first structural side into the fastening region, the first bent barb having a first back portion and a first front portion adjacent to and pointing toward the primary object, when the primary object has been inserted into the fastening region, the first front portion having a first angle with respect to the primary object which is different than a respective second angle that the first front portion would have with respect to the primary object if the first barb were straight and not bent, the fastening region having an insertion end through which the primary object is to be inserted, the first back portion of the first bent barb originating from a point on the first structural side located under said insertion point and being closer to the insertion point than the first front portion of the first bent barb.

13. A vehicle as defined in claim 12, wherein the first angle is greater than the second angle.

14. A vehicle as defined in claim 13, further comprising a second structural side opposite the first structural side.

15. A vehicle as defined in claim 14, wherein the second structural side comprises a second barb.

16. A vehicle as defined in claim 15, wherein the second barb is a straight barb.

17. A vehicle as defined in claim 12, further comprising a second structural side opposite the first structural side.

18. A vehicle as defined in claim 17, wherein the second structural side comprises a second barb.

19. A vehicle as defined in claim 18, wherein the second barb is a straight barb.

20. A vehicle comprising a fastener having a fastening region within which at least a part of a primary object can be inserted, and can be removed after it has been inserted, without manipulation of the fastener, the fastener comprising:

a first structural side adjacent to the fastening region, the first structural side comprising a first bent barb extending from the first structural side into the fastening region, the first bent barb having a first back portion adjacent to the first structural side and a first front portion adjacent to the primary object, when the primary object has been inserted into the fastening region, the first front portion having a first angle with respect to the primary object which is different than a respective second angle that the first front portion would have with respect to the primary object if the first barb were straight and not bent, the fastening region having an insertion end through which the primary object is to be inserted, the first back portion of the first bent barb being closer to the insertion point than the first front portion of the first bent barb; and a second structural side opposite the first structural side comprising a second barb, wherein the second bent barb extends from the second structural side into the fastening region, the second bent barb having a second back portion adjacent to the second structural side and a second front portion adjacent to the primary object, when the primary object has been inserted into the fastening region, the second front portion having a third angle with respect to the primary object which is different than a respective fourth angle that the second front portion would have with respect to the primary object if the second barb were straight and not bent, the second back portion of the second bent barb being closer to the insertion point than the second front portion of the second bent barb.

21. A vehicle as defined in claim 20, wherein the first angle is greater than the second angle.

22. A vehicle as defined in claim 20, wherein the third angle is greater than the fourth angle.

* * * * *